United States Patent
Fujita et al.

(10) Patent No.: US 9,748,610 B2
(45) Date of Patent: Aug. 29, 2017

(54) SPIRALLY-WOUND LITHIUM BATTERY

(71) Applicant: FDK Tottori Co., Ltd., Tottori (JP)

(72) Inventors: Yoshie Fujita, Tottori (JP); Nobuhiro Nishiguchi, Tokyo (JP); Satoshi Sunada, Tottori (JP); Takahide Kobashi, Tottori (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 14/757,403

(22) Filed: Dec. 23, 2015

(65) Prior Publication Data

US 2016/0190653 A1     Jun. 30, 2016

(30) Foreign Application Priority Data

Dec. 25, 2014    (JP) ................................ 2014-262295

(51) Int. Cl.
| | |
|---|---|
| *H01M 10/052* | (2010.01) |
| *H01M 10/0587* | (2010.01) |
| *H01M 2/02* | (2006.01) |
| *H01M 4/38* | (2006.01) |
| *H01M 10/04* | (2006.01) |
| *H01M 4/02* | (2006.01) |

(52) U.S. Cl.
CPC ....... *H01M 10/0587* (2013.01); *H01M 2/022* (2013.01); *H01M 2/0285* (2013.01); *H01M 4/382* (2013.01); *H01M 10/0431* (2013.01); *H01M 10/052* (2013.01); *H01M 2004/027* (2013.01)

(58) Field of Classification Search
CPC ......................... H01M 10/0525; H01M 10/052
See application file for complete search history.

(56) References Cited

U.S. PATENT DOCUMENTS

2013/0244073 A1*   9/2013   Fujimoto .......... H01M 10/0431
                                                      429/94

FOREIGN PATENT DOCUMENTS

JP         5252691 B2     7/2013

OTHER PUBLICATIONS

FDK Corporation, "Lithium battery," [online] Internet <URL: http://www.fdk.co.jp/battery/lithium/index.html>, accessed on Sep. 7, 2013.

* cited by examiner

*Primary Examiner* — Olatunji Godo
(74) *Attorney, Agent, or Firm* — Harness, Dickey & Pierce, P.L.C.

(57) ABSTRACT

A spirally-wound lithium battery includes: a bottomed cylindrical cell can doubling as an anode current collector; and a strip-shaped electrode body including an anode and a cathode arranged faced each other via a separator, the anode including an anode active material of lithium metal or alloy, the cell can being sealed, with a non-aqueous organic electrolyte, containing the electrode body wound in a longitudinal direction, the electrode body being wound from a winding axis side around the axis in a vertical direction, an extending direction of a cell can cylindrical axis, such that the anode is arranged at an outermost circumference, the electrode body is attached with a conductor, continuously extending in the longitudinal direction thereof, on an outer circumferential surface of the anode, from a winding end of the anode to an area thereof opposed to an inner surface of the cathode on its winding end side.

2 Claims, 7 Drawing Sheets

SPIRALLY-WOUND LITHIUM BATTERY

CROSS-REFERENCE TO RELATED APPLICATION

This application claims the benefit of priority to Japanese Patent Application No. 2014-262295, filed Dec. 25, 2014, of which full contents are incorporated herein by reference.

BACKGROUND OF THE INVENTION

Field of the Invention

The present invention relates to a spirally-wound lithium battery using lithium metal or lithium alloy for an anode.

Description of the Related Art

A lithium battery using lithium metal or lithium alloy for an anode active material includes: a primary battery using manganese dioxide, copper oxide, or the like for a cathode active material, and a secondary battery using lithium cobalt composite oxide ($LiCoO_2$) or the like for a cathode active material. The lithium battery has a configuration in which a battery can is filled with an electrode body comprising a cathode material including the cathode active material and an anode material including the anode active material, arranged to be opposed to each other via a separator, together with a non-aqueous organic electrolyte, and such an outer case filled therewith is sealed. Note that although lithium batteries have various types depending on the configurations of its outer body and its electrode body, a spirally-wound lithium battery, which is configured such that a wound electrode body is stored in a bottomed cylindrical battery can (hereinafter, also referred to as an anode can) serving also as an anode current collector, will be described in present embodiments.

Figure 1:
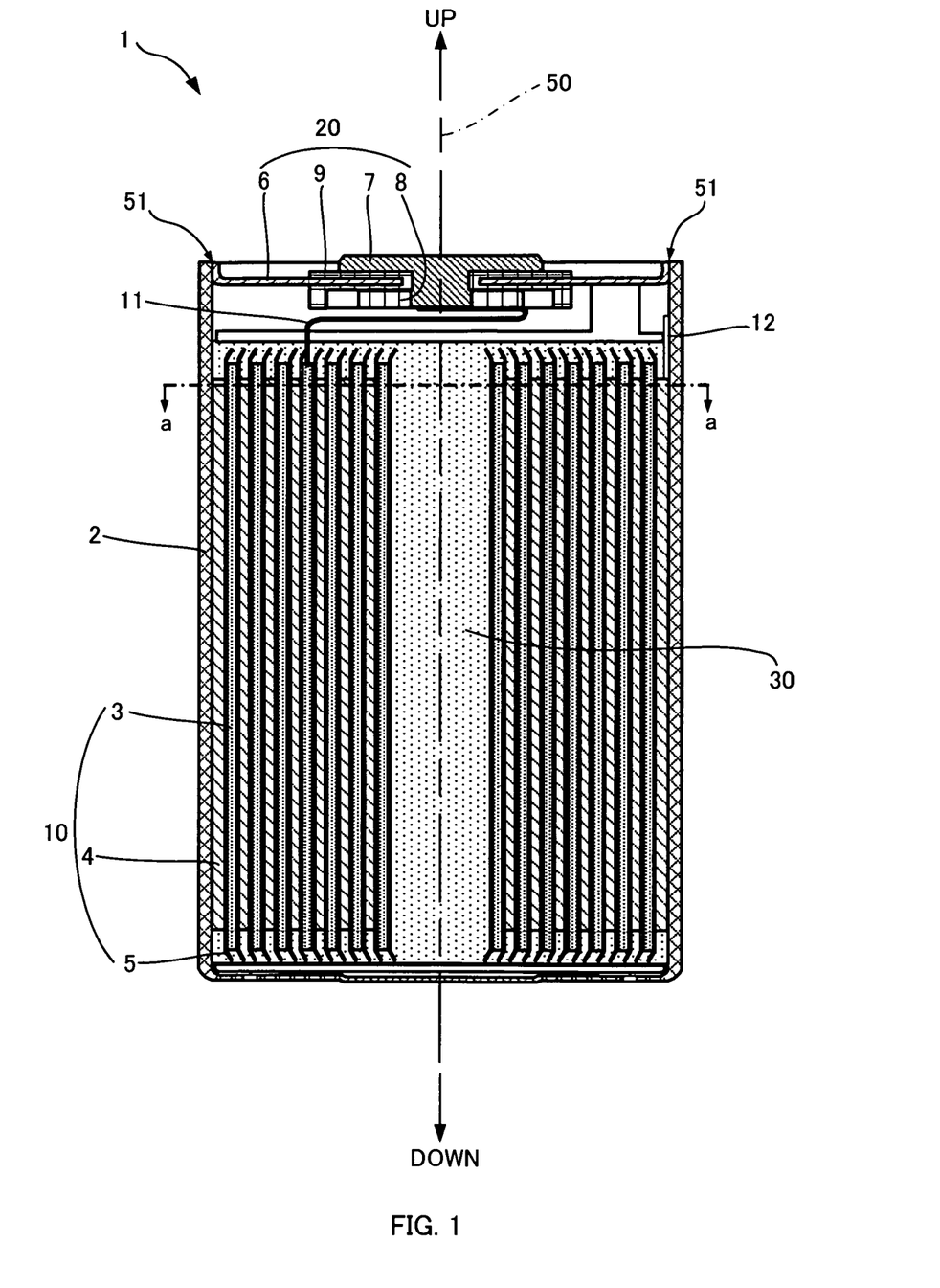
FIG. 1 is a longitudinal sectional view illustrating a structure of a spirally-wound lithium battery.

FIG. 1 illustrates an outline configuration of a spirally-wound lithium battery 1. The spirally-wound lithium battery 1 illustrated in FIG. 1 includes a bottomed cylindrical anode can 2. FIG. 1 is a longitudinal sectional view illustrating the spirally-wound lithium battery 1 when the extending direction of the cylindrical axis 50 in the anode can 2 is set as an up-and-down (longitudinal) direction, with the bottom of the anode can 2 being arranged downward. The spirally-wound lithium battery 1 stores, in the anode can 2, a cathode 3, an anode 4, a separator 5, and a non-aqueous organic electrolyte 30, as power generation elements. Further, the spirally-wound lithium battery 1 has such a basic configuration that an opening of the anode can 2 is sealed with a sealing body 20.

The cathode 3 configuring the power generation elements is obtained such that, for example, a stainless steel lath is coated with a cathode material in a slurry form, cut into a predetermined size and then dried. The anode 4 is made of lithium metal or a lithium alloy in a plate form (hereinafter, also referred to as a lithium anode 4). Then, the lithium anode 4 and the cathode 3 are arranged in such a manner as to be opposed to each other via the separator 5 made of, for example, a microporous polyolefin film, thereby configuring a strip-shaped electrode body 10, and the strip-shaped electrode body 10 is inserted in the anode can 2 in a wound state.

In the spirally-wound lithium battery 1 given here, the sealing body 20 includes a sealing plate 6, a positive terminal 7, a metal washer 8, and a sealing gasket 9. The sealing plate 6 is in a disk shape with an opening provided at the center thereof, and the edge of the disk is bent upward. In the central opening of the sealing plate 6, the metal positive terminal 7 and the metal washer 8 are swaged via the resin sealing gasket 9. Then, the edge of the sealing plate 6 and the upper edge of the anode can 2 are laser welded (at the position of the reference numeral 51 in the figure). Thus, the opening of the anode can 2 is sealed and the anode can 2 is hermetically sealed. Further, a cathode current collector and the lower surface of the positive terminal 7 are coupled to each other via a positive electrode tab 11, and the lithium anode 4 and the inner surface of the anode can 2 are coupled to each other via an anode tab 12. And, the hermetically sealed anode can 2 is filled with the non-aqueous organic electrolyte 30 obtained by dissolving lithium salt in a non-aqueous solvent. Note that the related technology is described in Japanese patent publication No. 5252691 below. Further, configuration of various lithium primary batteries are described in FDK Corporation, "lithium battery", [online], [Searched on Sep. 7, 2013], Internet <URL: http://www.fdk.co.jp/battery/lithium/index.html>.

Regardless of configurations, in a lithium battery, lithium anode is being dissolved with discharge. Then, in a spirally-wound lithium battery using an anode can, there is such a problem called "lithium break" that a lithium anode may crack or break in a discharge ending stage in some cases. That is, the lithium anode physically "breaks". If the lithium anode cracks, internal resistance increases. If the lithium anode breaks, the area thereof in which the lithium anode is not electrically connected to the anode tab would not contribute to power generation at all, resulting in substantial decrease in battery capacity.

In the technique disclosed in the above Japanese patent publication No. 5252691, anode current collectors are certainly stacked on one surface of a wound lithium anode, and it is described that "the anode current collectors has a width equal or greater than the width of a metallic lithium foil or lithium alloy foil, and a greater length, and this can avoid metallic lithium foil or lithium alloy foil from breaking along the circumference of the anode current collector and being electrically disconnected." However, in the technique described in Japanese patent publication No. 5252691, the initial internal resistance is large or voltage may greatly drop in the discharge ending stage.

SUMMARY OF THE INVENTION

A spirally-wound lithium battery according to an aspect of the present invention, includes: a bottomed cylindrical cell can doubling as an anode current collector; and a strip-shaped electrode body including an anode and a cathode arranged to be opposed to each other via a separator, the anode including an anode active material of lithium metal or lithium alloy, wherein the cell can is sealed containing, together with a non-aqueous organic electrolyte, the electrode body in such a state as to be wound in a longitudinal direction, the electrode body is wound from a winding axis side around a winding axis in an up-and-down direction such that the anode is arranged at an outermost circumference, the up-and-down direction being an extending direction of a cylindrical axis of the cell can, and a conductor is attached to the electrode body on an outer circumferential surface of the anode, from a winding end of the anode to an area thereof opposed to an inner surface of the cathode on its winding end side, the conductor continuously extending in the longitudinal direction of the electrode body.

The conductor may have a width in the up-and-down direction equal to or greater than 5% and equal to or smaller than 100% of a width in the up-and-down direction of the electrode body.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

An embodiment of the present invention will hereinafter be described with reference to attached drawings. Note that redundant descriptions may be omitted, with the same or similar parts being designated by the same reference numerals, in the drawings used in the descriptions below. A part designated by a reference numeral in one drawing may not be designated by the reference numeral in other drawings, when unnecessary.

===Mechanism of Break in Lithium===

In order to maintain sufficient characteristics as a battery while avoiding various problems caused by break in lithium, it is desirable to clarify a mechanism of break in lithium in a spirally-wound lithium battery (cell). Thus, the mechanism, which will be described hereinafter, is presumed.

Figure 2A:
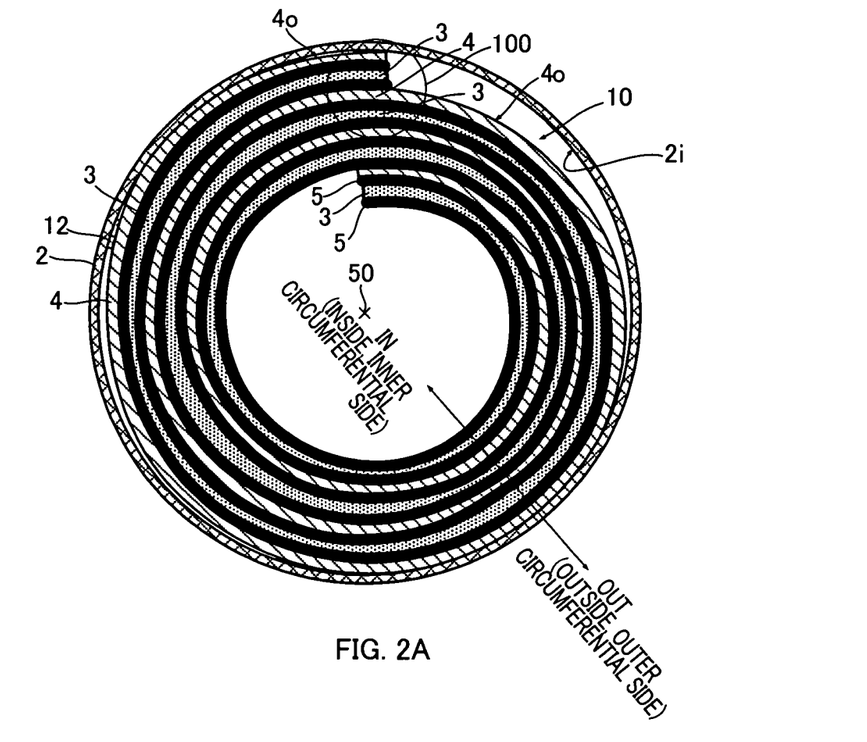
FIG. 2A is a diagram illustrating a mechanism of break in lithium in the spirally-wound lithium battery.
Figure 2B:
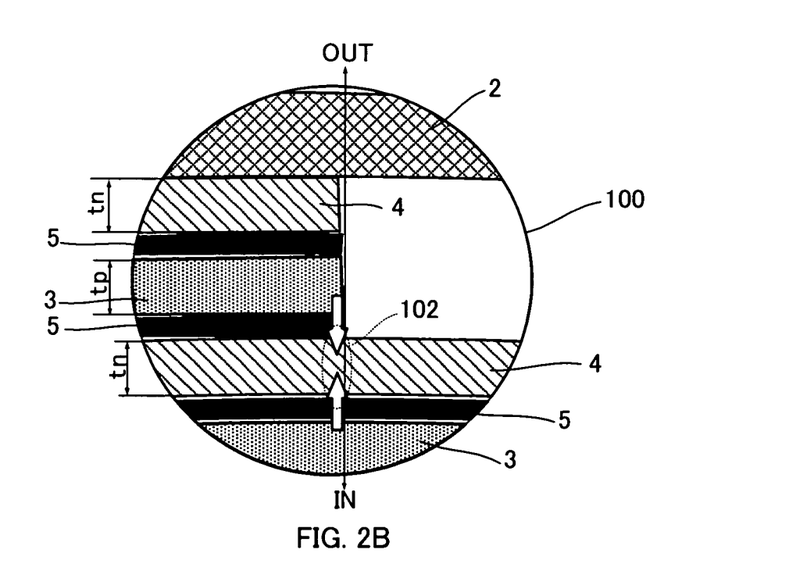
FIG. 2B is a diagram illustrating the mechanism of break in lithium in the spirally-wound lithium battery.

FIGS. 2A and 2B are cross-sectional views taken along an arrow line a-a in FIG. 1, and the mechanism of break in lithium in a spirally-wound lithium battery 1 will hereinafter be described with reference to FIGS. 2A and 2B. FIG. 2A is a diagram illustrating an overall cross-section of the spirally-wound lithium battery 1, and FIG. 2B is an enlarged view of an inside of a circle 100 of FIG. 2A. First, in the spirally-wound lithium battery 1, as a lithium anode 4 is being dissolved with discharge, the thickness Tn thereof is gradually being reduced. On the other hand, the thickness Tp of a cathode 3 is gradually increased. Thus, the lithium anode 4 is pressed to be compressed in the thickness direction, in a region where the cathode 3 is arranged on both the inner circumferential side and the outer circumferential side of the lithium anode 4. Further, lithium ions move with respect to the cathode 3 on the inner circumferential side and the outer circumferential side of the lithium anode 4, and thus the rate of dissolution in the region is greater than that in a region where the cathode 3 faces either one of the inner and outer circumferential sides of the lithium anode 4. In other words, this region becomes thinner rapidly.

Assuming here that an end part on the inner circumferential side of a wound electrode body 10 is a winding start (start of winding) and an end part on the outer circumferential side is a winding end (end of winding), since the winding start side of the electrode body 10 is a hollow, as illustrated in FIG. 2A, the force of pressing the lithium anode 4, caused by the expansion of the cathode 3, escapes toward a cylindrical axis 50. However, as illustrated in FIG. 2B, the outermost circumference of the electrode body 10 is in contact with an inner surface 2$i$ of an anode can 2 which is substantially undeformable. Thus, in a region 102 of the lithium anode 4, which faces an end part 3$a$ of the cathode 3 on the winding end side, it is difficult to let the force in the compression direction (hollow arrows in FIG. 2B), caused by the expansion of the cathode 3, escape, and this region is firmly pressed. In addition, in the region 102, since the lithium anode 4 faces the cathode 3 on the inner and outer circumferential sides, the thickness Tn is also rapidly reduced. As a result, the lithium anode 4 breaks in the region 102.

Thus, a spirally-wound lithium battery that has excellent characteristics as a battery while avoiding various problems associated with break in lithium has been implemented.

===Embodiment===

Figure 3:
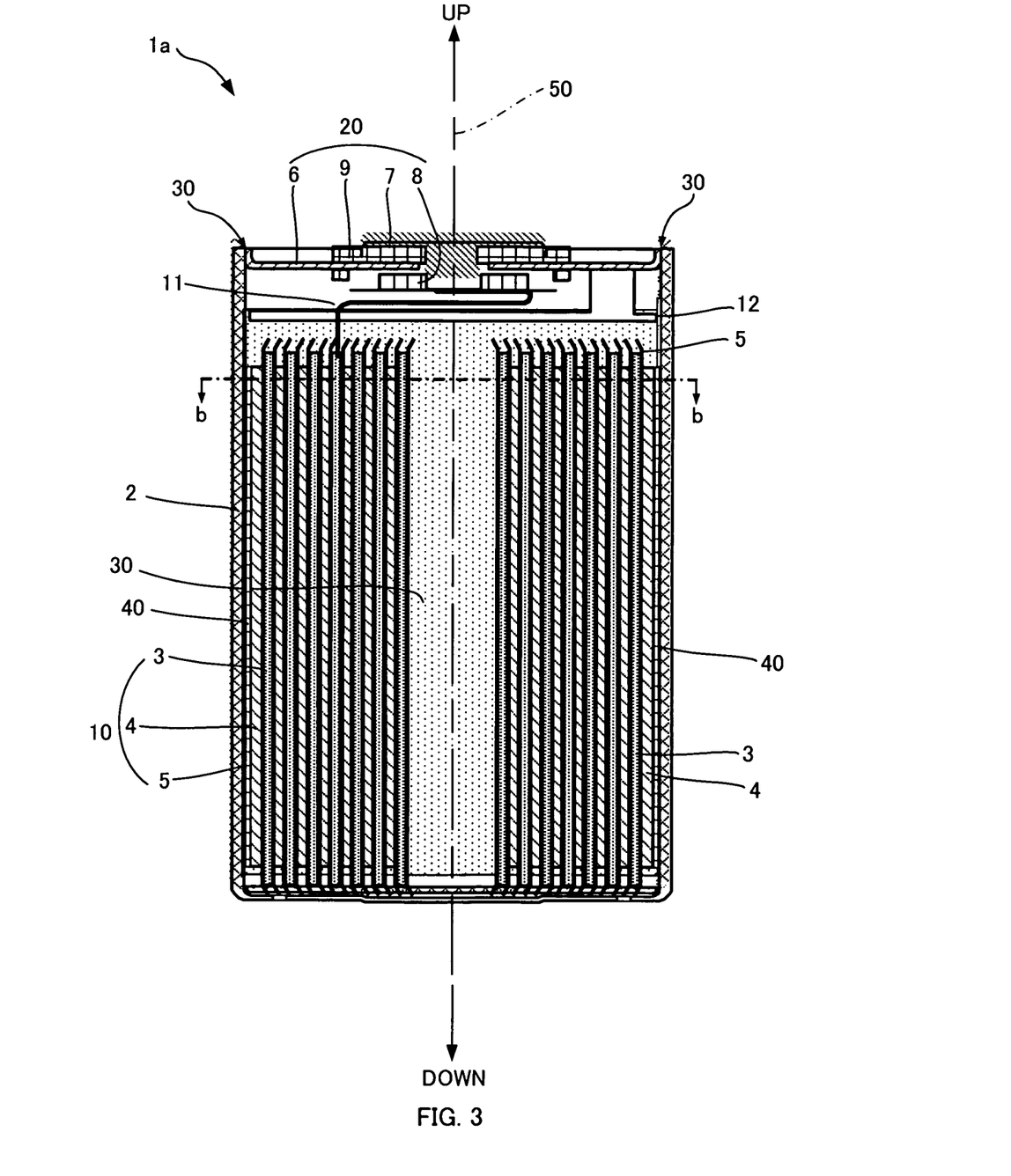
FIG. 3 is a longitudinal sectional view illustrating a structure of a spirally-wound lithium battery according to an embodiment of the present invention.
Figure 4A:
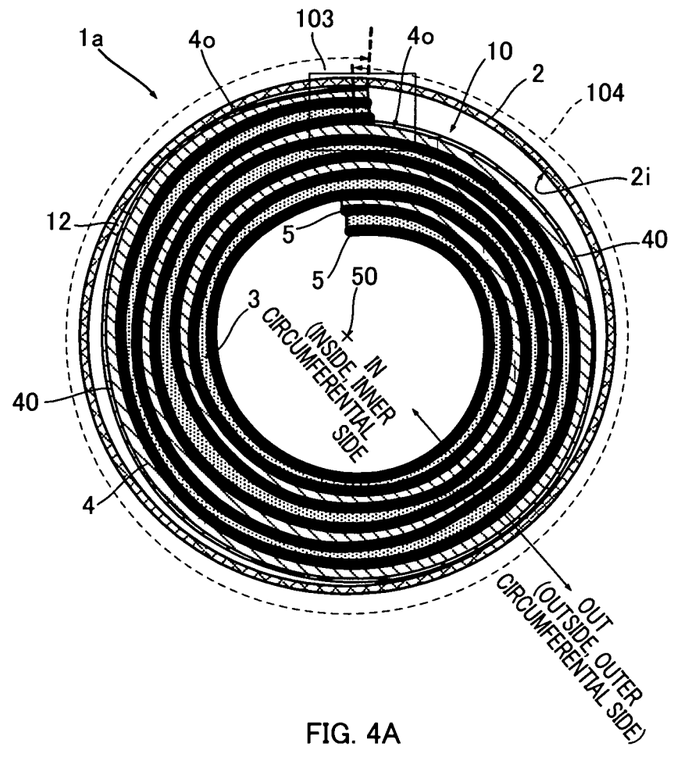
FIG. 4A is a cross-sectional view illustrating the spirally-wound lithium battery according to the above-described embodiment.
Figure 4B:
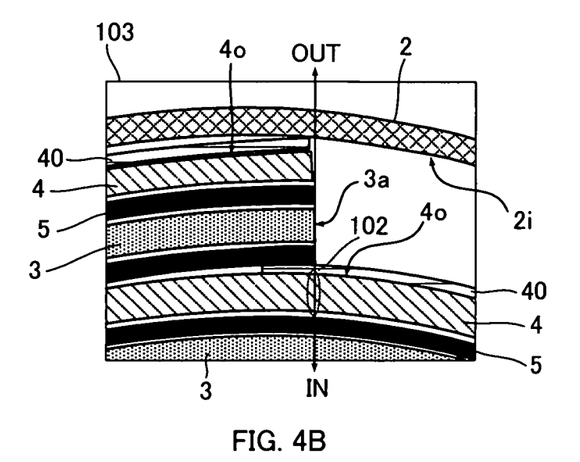
FIG. 4B is a cross-sectional view illustrating the spirally-wound lithium battery according to the above-described embodiment.

The spirally-wound lithium battery according to an embodiment of the present invention has a configuration in consideration of the above-described mechanism of break in lithium. Here, a lithium primary battery using lithium metal as a lithium anode is provided as an embodiment. FIG. 3 is a longitudinal sectional view illustrating the spirally-wound lithium battery (hereinafter, also referred to as a lithium battery 1$a$) according to the present embodiment. Further, FIGS. 4A and 4B are cross-sectional views taken along an arrow line b-b in FIG. 3. Then, FIG. 4A is a diagram illustrating an overall cross-section of the lithium battery 1$a$, and FIG. 4B is an enlarged view of an inside of a rectangular region in FIG. 4A. The lithium battery 1$a$ according to the present embodiment will be described below with reference to FIGS. 3, 4A, and 4B. Note that the reference numerals of the elements in the spirally-wound lithium battery 1, and the directions of up, down, in, and out, and the positional relationship of the winding start and the winding end in the electrode body 10, described in FIGS. 1, 2A, and 2B, will be employed hereinafter.

The basic configuration of the lithium battery 1$a$ is substantially similar to the spirally-wound lithium battery 1 illustrated in FIG. 1, that is, the strip-shaped electrode body 10, which includes the lithium anode 4 and the cathode 3 arranged to be opposed to each other via a separator 5, is wound around the cylindrical axis 50 of the anode can 2, serving as a winding axis, such that the lithium anode 4 is on the outermost circumferential side. However, in the lithium battery 1$a$ according to the present embodiment, a conductor 40 is attached onto the outermost circumferential surface side of the lithium anode 4. Specifically, as illustrated in FIGS. 4A and 4B, the conductor 40 is attached onto a surface (hereinafter, also referred to as the outer surface 4$o$), facing outside, of the lithium anode 4 in its wound state, in a region from the end of the winding end of the lithium anode 4 to an area thereof opposed to an inner surface of the cathode 3 on its winding end side (hereinafter, also referred to as a winding end region 104). That is, the conductor 40 is attached in such a manner as to straddle the region 102 where break in lithium easily occurs, in the outer surface 4o of the lithium anode 4, as described early in FIGS. 2A and 2B. Here, in order to evaluate the characteristics of the lithium battery 1a of the present embodiment, a plurality of spirally-wound lithium primary batteries are produced, as samples, with/without the conductor 40, or with the conductor 40 attached in areas different from one another, to measure the various characteristics at the ending stage of discharge with respect to the samples.

===Samples===

The samples are produced such that the anode can 2, having an external size of a diameter of 17 mm and a height of 45 mm, is sealed containing the electrode body 10 in its wound state, together with a non-aqueous organic electrolyte (hereinafter, also referred to as an electrolyte 30). The cathode 3 configuring the electrode body 10 is produced such that a stainless steel lath coated with a cathode material in slurry form, obtained by mixing electrolytic manganese dioxide (EMD) serving as a cathode active material, carbon black serving as a conductive material, and a binder (fluorine-based binder, etc.) in a certain ratio (e.g., EMD:carbon black:binder=93 wt %:3 wt %:4 wt %), is cut in a certain size, and then dried. Note that the cathode is of a size having a vertical width (up-and-down width) of 38 mm and a length of 220 mm.

The lithium anode 4 is made of lithium metal in a plate form having a width of 38 mm and a length of 230 mm. Then, this lithium anode 4 and the cathode 3 are wound together with the separator 5 placed therebetween and are inserted in the anode can 2, the separator 5 including a microporous polyolefin film The electrolyte 30 uses, as a solvent, a well-known three-component non-aqueous solvent containing propylene carbonate (PC), ethylene carbonate (EC) and 1,2-dimethoxyethane (DME) with a volume ratio of 20 vol %, 20 vol %, and 60 vol %, respectively, and in this solvent, lithium trifluoromethanesulfonate ($LiCF_3SO_3$) is dissolved as supporting salt such that the concentration thereof becomes 0.8 mol/l, and such electrolyte 30 is used.

Further, the samples includes: the sample for the spirally-wound lithium primary battery without the conductor 40 being attached onto the outer surface side of the lithium anode, similarly to the spirally-wound lithium battery 1 illustrated in FIG. 1; and the samples for the spirally-wound lithium primary batteries each attached with the conductor 40, made of copper foil, onto the outer surface side of the lithium anode 4 in an area corresponding to each of the sample. FIGS. 5A, 5B, 5C, and 5D illustrate the samples with and without the conductor 40 and the samples with the conductors 40 attached to the corresponding areas, respectively. Here, these figures illustrate the outer surfaces 4o of the strip-shaped lithium anodes 4 before being wounded. It is assumed here that the leftward direction in the paper is the winding start side, that is, the inner circumferential side when the lithium anodes 4 wounded. Further, in these figures, the lithium anode 4 and the conductor 40 are illustrated in different hatchings such that the areas where the conductor 40 is attached are easily recognized.

Figure 5A:
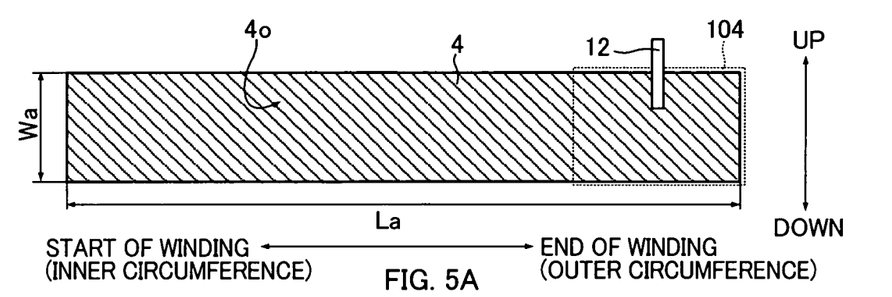
FIG. 5A is a diagram illustrating a shape and an attachment position of a conductor attached to a lithium anode of the spirally-wound lithium battery that is created to evaluate characteristics.
Figure 5B:
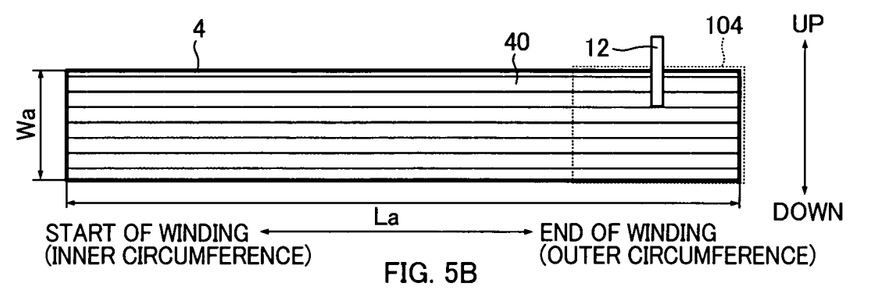
FIG. 5B is a diagram illustrating a shape and an attachment position of a conductor attached to a lithium anode of the spirally-wound lithium battery that is created to evaluate characteristics.
Figure 5C:
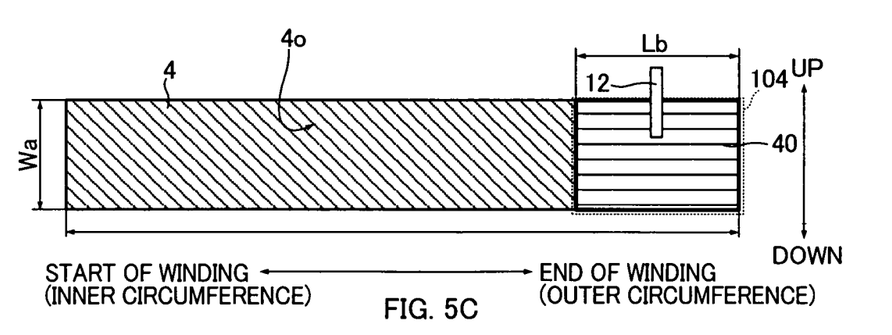
FIG. 5C is a diagram illustrating a shape and an attachment position of a conductor attached to a lithium anode of the spirally-wound lithium battery that is created to evaluate characteristics.
Figure 5D:
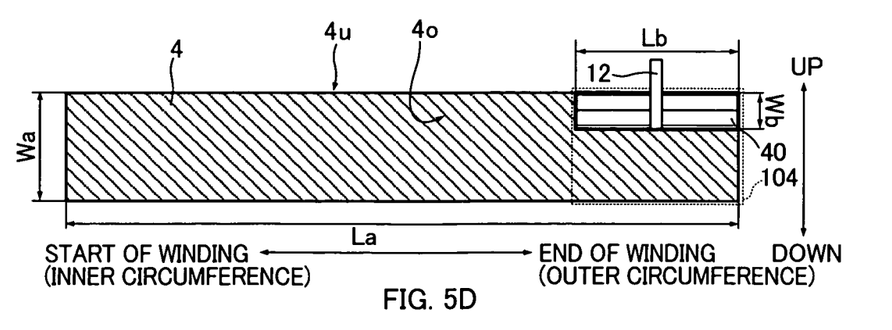
FIG. 5D is a diagram illustrating a shape and an attachment position of a conductor attached to a lithium anode of the spirally-wound lithium battery that is created to evaluate characteristics.

FIG. 5A illustrates the outer surface 4o of the lithium anode 4 in the sample corresponding to the spirally-wound lithium battery 1 illustrated in FIG. 1 (hereinafter, also referred to as a sample A). Since the conductor 40 is not attached, the whole outer surface 4o of the lithium anode 4 is exposed. Note that the lithium anode 4 is in a strip-like planar shape having a vertical width (up-and-down width) of Wa=38 mm and a length of La=230 mm. FIG. 5B is the sample corresponding to the technique described in Japanese registered patent publication No. 5252691 (hereinafter, a sample B), and the conductor 40 having the same vertical width of Wa=38 mm as in the lithium anode 4 is attached over the length of La=230 mm from the winding start to the winding end of the lithium anode 4. FIG. 5C is the sample corresponding to the lithium battery 1a illustrated in FIGS. 3, 4A, and 4B (hereinafter, a sample C), and the conductor 40 having the same vertical width of Wa=38 mm as in the lithium anode 4 is attached only in a certain area 104 on the winding end side. Then, this area 104 corresponds to the winding end region 104 in the lithium anode 4 in the aforementioned wounded state. FIG. 5D is the sample attached with the conductor 40 in the winding end region 104 similar to that in the sample C, but the conductor 40 has a vertical width of Wb=2 mm which is about 5% of the vertical width of the lithium anode 4 (hereinafter, a sample D). Note that, in the samples A to D, an anode tab 12 is attached in the winding end region 104 on the outer surface of the lithium anode 4 or the conductor 40 such that the anode tab 12 is arranged on the outermost circumference, which is in contact with the inner surface of the anode can 2, in the wound electrode body 10.

===Battery Characteristics===

<Battery Voltage Characteristics and Internal Resistance Characteristics in Discharge Ending Stage>

A plurality of samples for each of the above described samples A to D are produced, and the samples of the same type are applied with a load of 200Ω, to be discharged up to the discharge depth of 90%, 95%, and 100% of design capacity. Then, the battery voltage and the internal resistance are measured for each of the samples in the initial state before discharge and in the state after discharge at each of the discharge depths, to obtain the rates of drop in battery voltage and the rates of increase in internal resistance, after discharge at the respective depths, with respect to those in the initial state.

Table 1 illustrates the voltage drop rate and the internal resistance increase rate in each of the samples.

TABLE 1

| | DISCHARGE DEPTH | | | | | |
|---|---|---|---|---|---|---|
| | 90% | | 95% | | 100% | |
| SAMPLE | VOLTAGE DROP RATE | INTERNAL RESISTANCE INCREASE RATE | VOLTAGE DROP RATE | INTERNAL RESISTANCE INCREASE RATE | VOLTAGE DROP RATE | INTERNAL RESISTANCE INCREASE RATE |
| A | 13% | 180% | 20% | 640% | 20% | 1740% |
| B | 21% | 1840% | 21% | 1900% | 22% | 1910% |

TABLE 1-continued

| | DISCHARGE DEPTH | | | | | |
|---|---|---|---|---|---|---|
| | 90% | | 95% | | 100% | |
| SAMPLE | VOLTAGE DROP RATE | INTERNAL RESISTANCE INCREASE RATE | VOLTAGE DROP RATE | INTERNAL RESISTANCE INCREASE RATE | VOLTAGE DROP RATE | INTERNAL RESISTANCE INCREASE RATE |
| C | 11% | 174% | 11% | 223% | 13% | 1030% |
| D | 11% | 167% | 12% | 205% | 15% | 537% |

The voltage drop rate in Table 1 is given by the equation $(V_1-V_2)/V_1$, assuming that a voltage before discharge is $V_1$=100% and a voltage after discharge is $V_2$%. The internal resistance increase rate is given by the equation $R_2/R_1$, assuming that internal resistance before discharge is $R_1$=100% and internal resistance after discharge is $R_2$. Then, as illustrated in Table 1, in the sample A without the conductor 40 attached to the lithium anode 4 corresponding to the conventional spirally-wound lithium battery, the voltage drop rate and the internal resistance increase rate at a discharge depth of 90% are 13% and 180%, respectively. In the sample C corresponding to an embodiment of the present invention illustrated in FIGS. 3, 4A, and 4 and the sample D with a conductor having a vertical width Wb smaller than that of the sample C, both the voltage drop rates at a discharge depth of 90% are 11%, which have been slightly improved as compared with that in the sample A. Further, the internal resistance increase rates have also been improved as compared with that in the sample A. Further, the sample D is more excellent in internal resistance increase rate than the sample C. However, in the sample B with the conductor 40 attached onto the entire outer surface of the lithium anode 4, the voltage drop rate at a discharge depth of 90% is 21%, and the voltage in the sample B drops about twice as much as those in the samples C, D. The internal resistance increase rate is 1840%, which has increased ten times or more as much as those in the samples A, C, D.

At a discharge depth of 95%, the voltage in the sample A further drops as compared with that at a discharge depth of 90%, resulting in the voltage drop rate of 20%. Further, the internal resistance is 640%, which has increased three times or more as much as that at a discharge depth of 90%. Such an increase is considered to result from the lithium anode 4 starting breaking at a discharge depth of 95%. Note that, in the samples B to D, the voltage drop rates do not greatly change as compared with those at a discharge depth of 90%. In the sample B, the internal resistance increase rate slightly increases, while in the samples C, D, the internal resistance increase rates increase about 40% relative to those at a discharge depth of 90%, however they are extremely low as compared with that in the sample A.

Then, at a discharge depth of 100%, voltage drop rates do not greatly change in any of the samples, as compared with those at a discharge depth of 95%. In the samples A, B, the voltage drop rates are equal to or greater than 20%, while in the samples C and D, the rates are 13% and 15%, respectively. That is, it has been recognized that, in the samples C, D, a certain amount of voltage value can be maintained also at a discharge depth of 100%.

The internal resistance greatly increases in the samples other than the sample B. This is recognized such that, since the sample B is attached with the conductor 40 on the entire outer surface of the lithium anode 4, only the resistance component of the conductor remains after the internal resistance in the anode itself greatly increases at a discharge depth of 90%, and thus at a discharge depth greater than that, only the internal resistance of the conductor 40 is measured. In the samples C and D, the internal resistances increase about four times and twice and a half as much as those at a discharge depth of 95%, respectively. However, the absolute values of the increase rates are greatly lower than those in the samples A, B.

<Pulse Characteristics in Discharge Ending Stage>

Next, the pulse characteristics in the discharge ending stage are evaluated in these samples. Here, the pulse characteristics are evaluated by measuring the closed circuit voltage when a load of 50Ω in 0.29 seconds is applied at room temperature and the closed circuit voltage when a current of 150 mA per second is passed through the samples kept under a temperature of −30° C. Note that the discharge depths are 90%, 95%, and 100% at room temperature and 90% and 95% at low temperature.

Table 2 illustrates the pulse characteristics in the samples.

TABLE 2

| | DISCHARGE DEPTH | | | | |
|---|---|---|---|---|---|
| | ROOM TEMPERATURE | | | LOW TEMPERATURE(−30° C.) | |
| SAMPLE | 90% | 95% | 100% | 90% | 95% |
| A | 0.02 | 0.11 | 0.40 | 0.58 | 1.68 |
| B | 0.51 | 0.52 | 0.55 | 2.20 | 2.57 |
| C | 0.03 | 0.05 | 0.40 | 0.59 | 0.67 |
| D | 0.03 | 0.04 | 0.34 | 0.56 | 0.64 |

The closed circuit voltage in Table 2 is a difference between the closed circuit voltage in the initial state and the closed circuit voltage after discharge, that is, a voltage drop value in the closed circuit voltage. Thus, it is understood that the greater the voltage drop value is, the more greatly the pulse characteristics are degraded. Then, as illustrated in Table 2, the drop values in closed circuit voltage at a discharge depth of 90% in the samples A, C, D are 0.02 V, 0.03 V, and 0.03 V at room temperature and 0.58 V, 0.59V, and 0.56 V at low temperature, respectively, in which the drop values are small and the differences among the samples are not great. However, in the sample B, the drop value is 0.51 V at room temperature. Especially, at low temperature, the drop value is 2.20 V and it is recognized that it is not substantially operated as a battery. Note that, in the sample B, the drop value in the closed circuit voltage at a discharge depth of 95% or 100% at room temperature does not substantially change as compared with that at a discharge depth of 90%. At low temperature, the voltage at a discharge depth of 95% drops further about 15% relative to that at a discharge depth of 90%. In either case, it is not operated as a battery at low temperature.

The samples A, C, D will be described, and in the sample A, the closed circuit voltage at a discharge depth of 95% further drops by about 0.1 V and 1.0 V at room temperature and a low temperature, respectively, as compared with that at discharge depth of 90%, which is caused by "break" in the lithium anode 4. In the samples C, D, the closed circuit voltages at a discharge depth of 95% are substantially the same as those at a discharge depth of 90%, with drop in the voltages at room temperature of about 0.01 to 0.02 V. Especially, drop in the voltages at low temperature can be reduced to 0.1 V or less. This is because the conductor 40 is attached across the area where break in the lithium anode 4 would occur, thereby securing conduction over the length of the lithium anode 4. That is, drop in the closed circuit voltages can be reduced by about 40% relative to that in the sample A. Thus, it can be said that the samples C, D with the conductor 40 attached only in the winding end region 104 in the lithium anode 4 have excellent pulse characteristics. Note that since the lithium anode 4 is in a nearly consumed state at a discharge depth of 100% at room temperature, the samples A, C, D have similar results.

<Vertical Width of Conductor>

When comparing the characteristics between the samples C and D, the voltage drop rates in the discharge ending stage are substantially equal therebetween, however, the sample D is more excellent in the internal resistance increase rate and the pulse characteristics. The internal resistance increase rate in the sample D at a discharge depth of 100% is about 50% relative to that in the sample C. This is considered to be due to the area of the conductor 40 in the sample D being smaller than that in the sample C, resulting in the reaction area of the lithium anode being relatively large. Whereas, as the conductor 40 is made thinner, the resistance of the conductor 40 is increased, and if the lithium anode 4 breaks, the thin conductor 40 results in increase in the internal resistance on the contrary. Thus, it is reasonable that the minimum vertical width Wb of the conductor 40 is set about 5% of the vertical width Wa of the lithium anode 4, considering the characteristics of the sample D.

<Discharge Time>

When considering the battery voltage characteristics, the internal resistance characteristics, and the pulse characteristics in the above described samples A to D, it is recognized, in the sample A, that degradation of the characteristics accompanied by break in lithium anode becomes obvious at around a discharge depth of 95%. In the sample B, it can be recognized that since the conductor 40 is attached over the length of the lithium anode 4, the reaction area is reduced accordingly, which causes degradation in various characteristics from the initial state. Further, since the conductor 40 is attached over the entire outer surface of the lithium anode 4, when the electrode body 10 including the lithium anode 4 is wound and stored in the anode can 2 whose internal diameter is specified, the electrode body 10 will have a large volume occupied in the anode can 2. Thus, the electrolyte 30 will have a decreased filling amount in the anode can 2, resulting in degradation of battery characteristics such as decrease in battery capacity. In the samples C, D substantially corresponding to embodiments of the present invention, the conductor 40 is attached only in the winding end region 104, considering the mechanism of break in the lithium anode 4. Thus, degradation of the characteristics accompanied by "break" in the lithium anode 4 is restrained, and furthermore the excellent characteristics are maintained also in the discharge ending stage.

Figure 6:
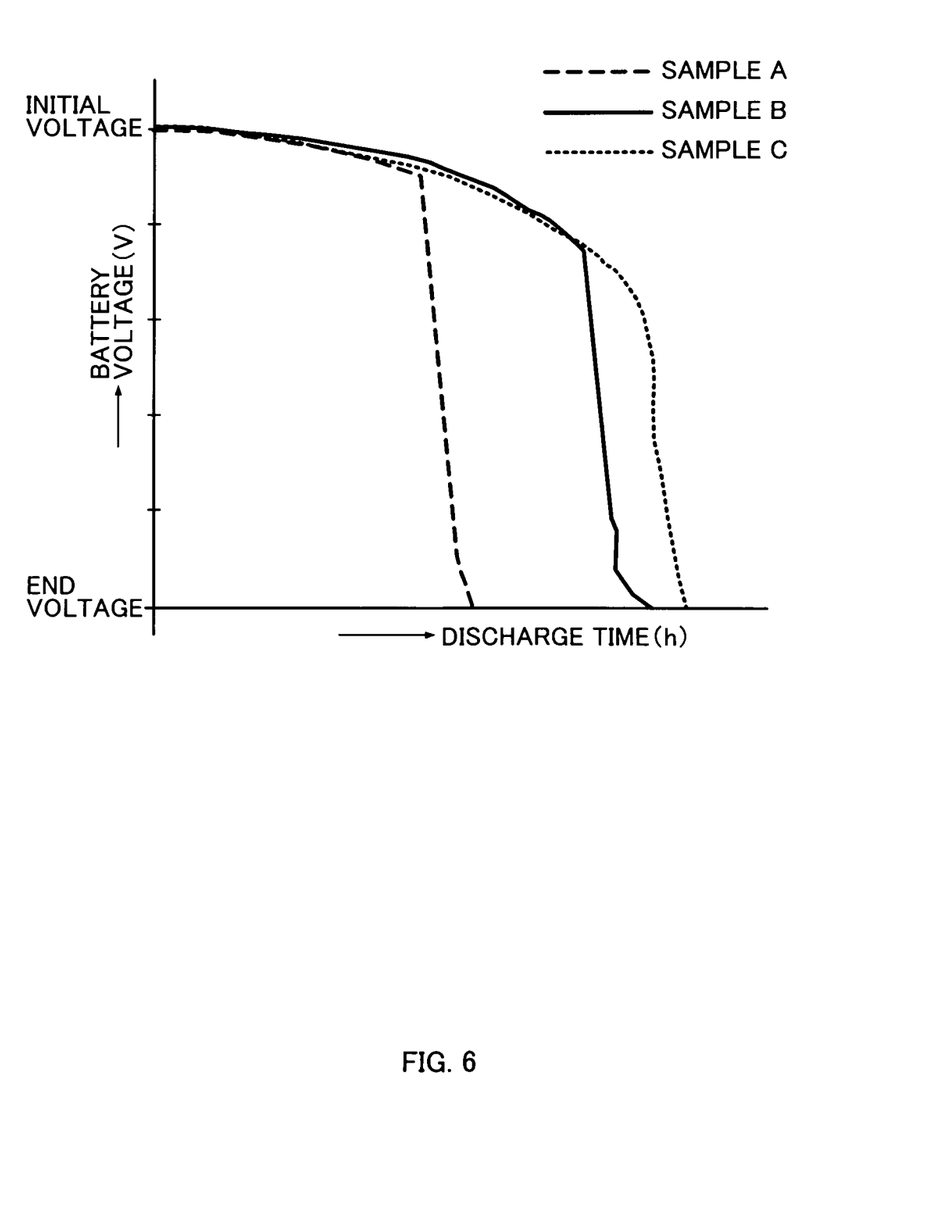
FIG. 6 is a diagram illustrating discharge characteristics of the spirally-wound lithium battery according to the above-described embodiment.

Then, in order to confirm whether the above consideration is right, the samples A to C are applied with the same load, thereby being continuously discharged, and a period of time until when an end voltage has been reached is measured. FIG. 6 illustrates the measurement result of such discharge time. FIG. 6 illustrates the relationship between an elapsed time from the start of discharge and a relative battery voltage value with respect to a battery voltage in the initial state. In the sample B, since the reaction area is small from the beginning, discharge is completed in a short time. In the sample A, the lithium anode breaks in the discharge ending stage in which dissolution of the lithium anode progresses, and the discharge ends before all the lithium anode has been consumed. Then, in the sample C, it is recognized that the lithium anode has been consumed to the end and the discharge capacity as designed is secured.

As such, in the lithium battery 1a having the configuration of the above described sample C or D, internal resistance in the initial state is small, and sufficient voltage can be maintained up to the discharge ending stage. It is a matter of course that problems such as increase in internal resistance and/or decrease in battery capacity can be solved, even if the lithium anode 4 breaks in association with discharge.

===Other Embodiment===

Figure 7:
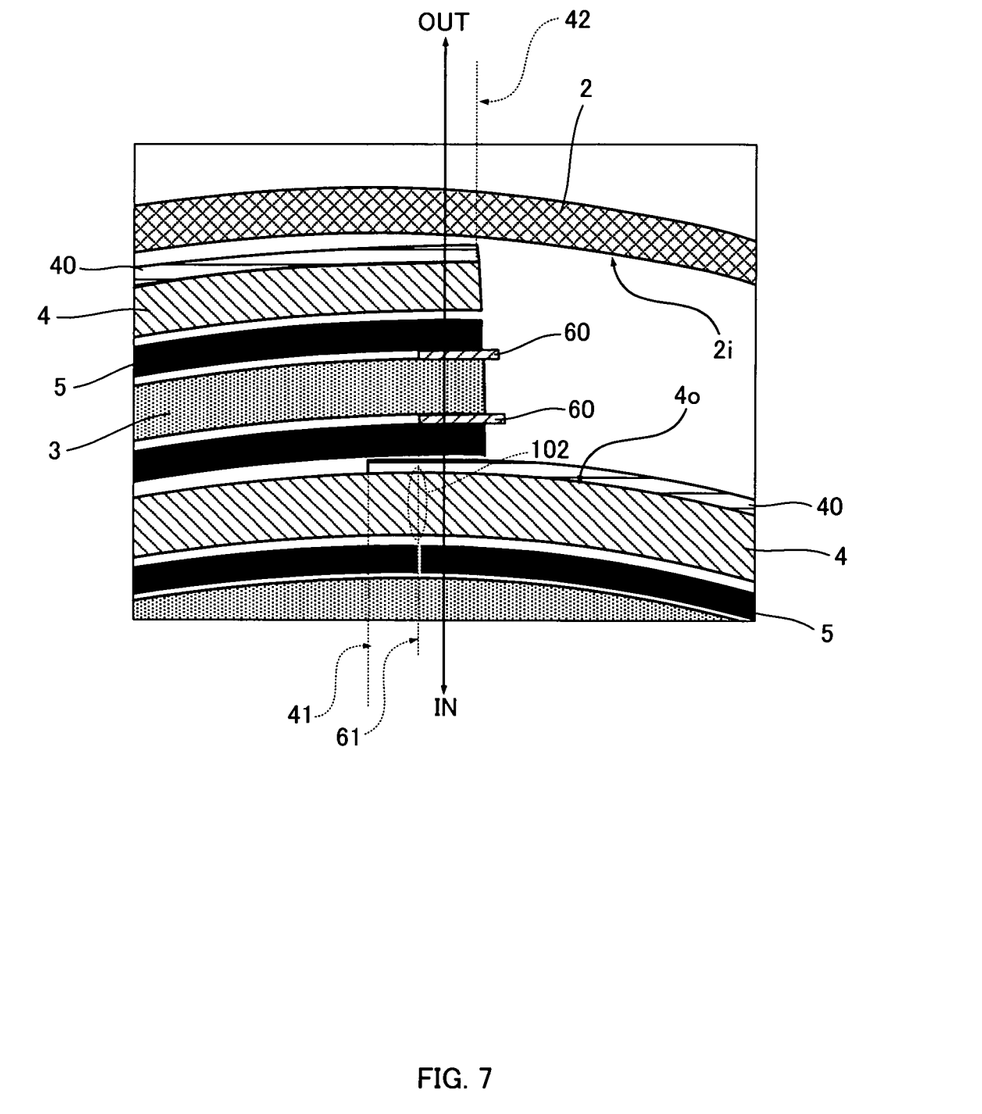
FIG. 7 is a diagram illustrating an area where a conductor is attached of a spirally-wound lithium battery according to another embodiment of the present invention.

In the spirally-wound lithium battery according to an embodiment of the present invention, the conductor continuously extending in a longitudinal direction is attached to the lithium anode in the winding end region thereof which is from the end of the winding end thereof to the area thereof opposed to the inner surface of the cathode on its winding end side. Thus, in the end part itself of the winding end of the cathode, the inner surface side thereof may not be opposed to (face) the outer circumferential side of the lithium anode. Even in such a case, the winding end region, in which the conductor is to be attached, is considered as a region up to a part opposed to "the inner surface on the winding end side" of the cathode. FIG. 7 is a diagram illustrating a lithium battery in which the winding end region 104 is different from that of the above described embodiment. FIG. 7 illustrates an area, under magnification, corresponding to a rectangular region 103 in FIGS. 4A and 4B. As illustrated in this figure, a protective tape 60 or the like may be attached in the end part of the cathode 3 on the winding end side for the purpose of protecting the separator 5 from the edge of the end part. In such a case, a winding start position 61 of the protective tape 60 in an attachment area may be set substantially at the end part of the winding end of the cathode 3. That is, in the lithium anode 4, a part facing the winding start position 61 of the protective tape 60 is given as the region 102 in which lithium break may easily occur, and the conductor 40 may be attached in a manner across the region 102 toward an end part 42 of the winding end.

Although copper foil is used for the conductor, it may be an electrical conductor, in foil or laminated form, that is not alloyed with lithium, such as various metallic foil (copper alloy, nickel, stainless steel, titanium, and alloy of the above), metal lath, wire lath, woven wire netting, metallic form, punching metal, and the like. The shape of an anode can is not limited to a circular cylindrical shape, and may be, for example, a bottomed rectangular cylindrical shape, and an electrode body may be wound along a cross-sectional shape of an anode can. Note that although the spirally-wound lithium batteries according to the above embodiments are a primary battery, but may be a secondary battery.

According to lithium batteries of the present embodiments, it is possible to maintain sufficient voltage up to the discharge ending stage with internal resistance being small, while avoiding such a problem as decrease in discharge capacity accompanied by "break" in lithium.

The invention claimed is:

1. A spirally-wound lithium battery comprising:
    a bottomed cylindrical cell can doubling as an anode current collector;
    a strip-shaped electrode body including an anode and a cathode arranged to be opposed to each other via a separator, the anode including an anode active material of lithium metal or lithium alloy; and
    a conductor that is sealed inside the cell can, wherein
    the cell can is sealed, together with a non-aqueous organic electrolyte and the conductor, containing the electrode body in such a state as to be wound in a longitudinal direction,
    the electrode body is wound from a winding axis side around a winding axis in an up-and-down direction such that the anode is arranged at an outermost circumference, the up-and-down direction being an extending direction of a cylindrical axis of the cell can, and
    the conductor is attached to the electrode body on an outer circumferential surface of the anode, from a winding end of the anode to an area thereof opposed to an inner surface of the cathode on its winding end side, the conductor continuously extending in the longitudinal direction of the electrode body.

2. The spirally-wound lithium battery according to claim 1, wherein
    the conductor has a width in the up-and-down direction equal to or greater than 5% and smaller or equal to 100% of a width in the up-and-down direction of the electrode body.

* * * * *